(12) United States Patent
Wendling

(10) Patent No.: US 9,935,939 B1
(45) Date of Patent: Apr. 3, 2018

(54) KEYBOARD LOGIN MANAGER

(71) Applicant: Amazon Technologies, Inc., Reno, NV (US)

(72) Inventor: Michael Wendling, Woodside, CA (US)

(73) Assignee: Amazon Technologies, Inc., Reno, NV (US)

( * ) Notice: Subject to any disclaimer, the term of this patent is extended or adjusted under 35 U.S.C. 154(b) by 324 days.

(21) Appl. No.: 14/304,047

(22) Filed: Jun. 13, 2014

(51) Int. Cl.
*G06F 21/83* (2013.01)
*H04L 29/06* (2006.01)

(52) U.S. Cl.
CPC .................................. *H04L 63/083* (2013.01)

(58) Field of Classification Search
CPC ................. H04L 63/08; H04L 63/0853; H04L 2463/082; H04L 9/3226; G06F 21/629
See application file for complete search history.

(56) References Cited

U.S. PATENT DOCUMENTS

| | | | | |
|---|---|---|---|---|
| 5,603,053 A * | 2/1997 | Gough | ................. | G06F 3/0481 345/156 |
| 6,088,143 A * | 7/2000 | Bang, II | ............. | H04B 10/1141 340/5.54 |
| 8,544,072 B1 * | 9/2013 | Masone | .............. | H04L 63/0815 726/10 |
| 9,345,061 B1 * | 5/2016 | Evans | .................... | H04W 84/12 |
| 2013/0312075 A1 * | 11/2013 | Nichols; Jonathan | .. | G06F 21/41 726/8 |
| 2014/0101772 A1 * | 4/2014 | Anzai | ..................... | G06F 21/83 726/26 |

* cited by examiner

*Primary Examiner* — Eleni A Shiferaw
*Assistant Examiner* — Paul E Callahan
(74) *Attorney, Agent, or Firm* — Lowenstein Sandler LLP

(57) ABSTRACT

A user-input application comprises a login manager configured to receive an input call from an application and determine whether stored information associated with the application is available in the login manager data store. If stored information is available, the login manager provides the stored information to the application from which the input call was received.

19 Claims, 11 Drawing Sheets

| App ID | Domain | User name | Email | Password | Telephone | Other |
|---|---|---|---|---|---|---|
| 2514 | acme.com | johndone1 | jdoe@acme.com | Whiskers | 555-1234 | 10 Main St. |
| 702 | 704 | 706 | 708 | 710 | 712 | 714 |

Login Manager Database 360

KEYBOARD LOGIN MANAGER

BACKGROUND

A large and growing population of users enjoys entertainment through the consumption of media items, including electronic media, such as electronic books (also referred to herein as ebooks), electronic newspapers, electronic magazines, other electronic publications, audio books, and digital video. Users employ various electronic devices to consume such media items. Among these electronic devices are electronic book readers, cellular telephones, personal digital assistants (PDAs), portable media players, tablet computers, electronic pads, netbooks, desktop computers, notebook computers, and the like. These electronic devices also offer a platform for the execution of applications, such as entertainment applications, productivity applications, business applications, social networking applications or other types of applications.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 7 is a diagram illustrating a login manager database, according to embodiment.

DETAILED DESCRIPTION

Figure 1:
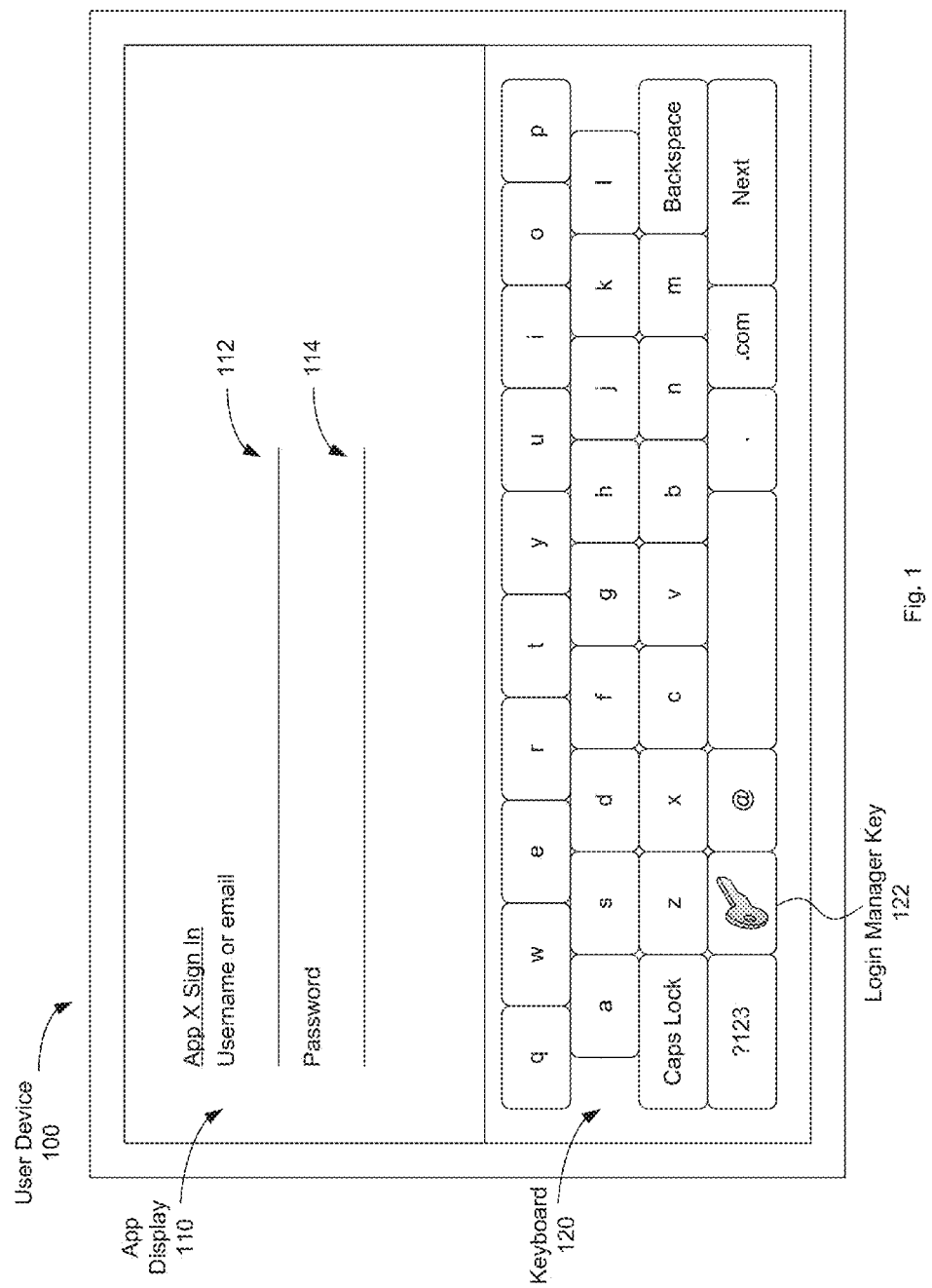
FIG. 1 is a diagram illustrating a user interface for a keyboard login manager, according to an embodiment.

Embodiments are described for a keyboard login manager. The keyboard login manager can maintain login information (e.g., usernames and passwords) or other information that may be input to applications running on a user device. The keyboard login manager may be part of a keyboard application on the user device. The keyboard application may be a standalone program or may be part of an operating system running on the device. The keyboard application, and thus the keyboard login manager, can be accessed by any application running in a complied language platform outside of a web browser on the device. As a user may have different login credentials for a variety of applications, it may be challenging to remember them all. The cross-application access capabilities of the keyboard login manager provide a solution that allows login information (or other information) to be input to any application running or operating on the device.

In one embodiment, when an application is launched, the application may call the keyboard application by making an application programming interface (API) call to an API published by the keyboard application. In response, the keyboard application may display an on-screen keyboard. In one embodiment, the keyboard includes a login manager key, which initiates action by the keyboard login manager when selected by the user. Via the initial API call, the login manager may identify the application and determine whether stored login information, such as a username or password, associated with that application is available in a login manager data store associated with the keyboard application. When stored login information is available (e.g., when such was previously input by the user), the login manager may present the stored login information to the user for selection. The user may select pieces or units of the stored login information for input into fields provided by the application and the login manager may provide the selected login information to the application.

In one embodiment, the keyboard login manager operates in a complied language platform environment and does not require the accessing of web pages or other resources in a web browser. In other embodiments, the keyboard login manager operates in a non-complied environment. The techniques described herein do not require any changes to application code by the application developers, as in certain embodiments, it is not necessary for the application to provide any information to the keyboard login manager aside from an identifier of the application. Using this identifier, the keyboard login manager can locate previously stored login data, provide that data to the user for selection, receive a selection of a piece or unit of the data and provide that data to the requesting application. As such, the user remains in complete control of their login information and controls which information is provided to the application and when it is provided. In this manner, the user can easily maintain login information for a large number of applications, which otherwise may be difficult to remember.

FIG. 1 is a diagram illustrating a user interface for a keyboard login manager, according to an embodiment. In one embodiment, the keyboard login manager can store login data (such user identifiers and passwords) or other data for use with a number of different applications or programs running on user device 100. In one embodiment, the user device 100 can present a user interface including application display 110 and keyboard 120. Application display 110 may be a user interface displayed by an application running on user device 100. In one embodiment, the application may be a standalone program that operates on the computing platform of user device 100, outside of any web browser. In one embodiment, application display 110 includes a number of fields which can receive user login information or other information. For example, the fields may include user identifier field 112, to receive a username or email address, and password field 114.

In one embodiment, when the application corresponding to application display 110 is launched, the application may call the keyboard application on user device 100, for example by making an application programming interface (API) call to an API published by the keyboard application. In response, the keyboard application may display keyboard 120. In one embodiment, a user may enter the username and password into the corresponding fields 112, 114 of application display 110 by selecting the appropriate alphanumeric keys presented by keyboard 120. In one embodiment, keyboard 120 may include a login manager key 122, which when selected by the user initiates action by the keyboard login manager. Via the initial API call, the login manager may identify which application is providing application display 110 and determine whether stored login information associated with that application is available in a login manager data store associated with the keyboard application. The keyboard application may manage the login manager data store, and control reads, writes and other accesses to the login manager data store. When stored login information is available (e.g., when such was previously input by the user), and in response to the selection of the login manager key 122, the login manager may present the stored login information to the user for selection. The user may select pieces or units of the stored login information for input into the fields 112 and 114 and the login manager may provide the selected login information to the application. In one embodiment, each unit of stored login information may include for example, a username, password, login credential, or other element of data. In another embodiment, in response to the selection of the login manager key 122, the login manager may automatically identify the appropriate pieces of login information and provide that information to the application without further user interaction. In yet another embodiment, in response to the initial API call, the login manager login manager may identify and provide the login information to the application without any user interaction. Additional details of the login manager are provided below.

Figure 2:
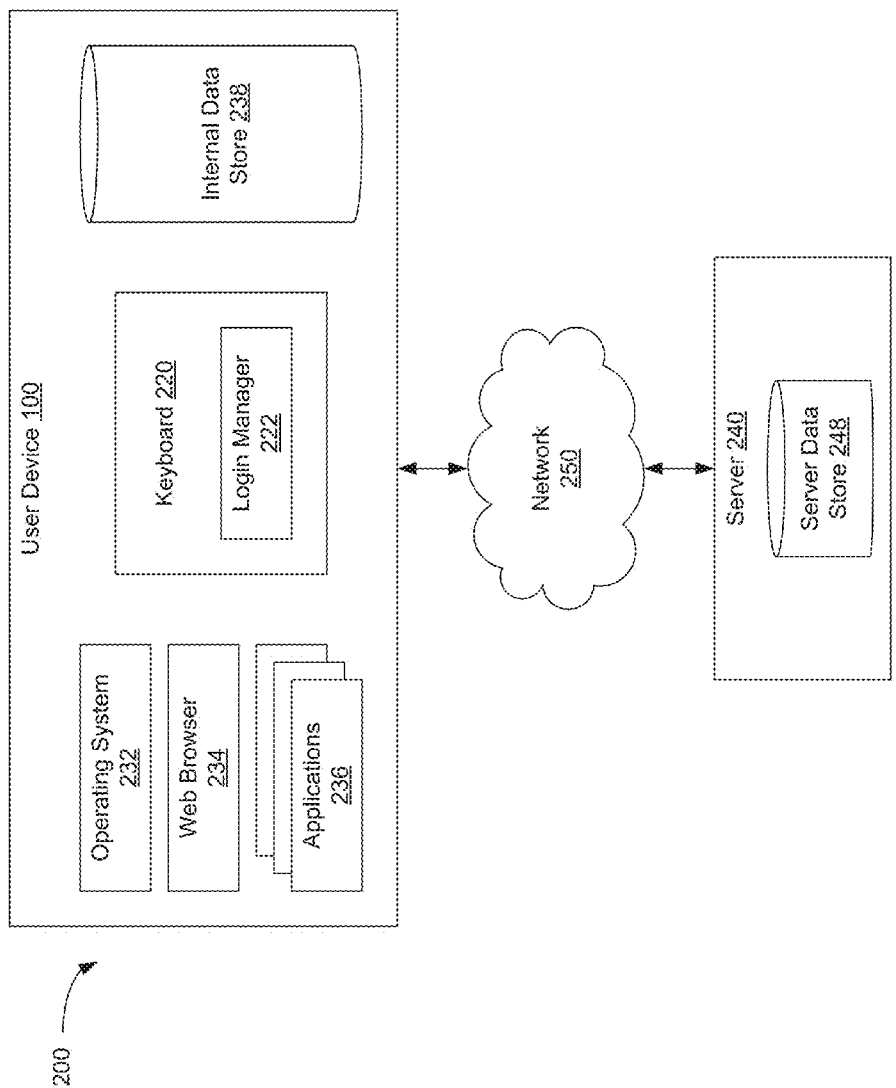
FIG. 2 is a block diagram illustrating an exemplary network architecture in which embodiments of the present invention may be implemented.

FIG. 2 is a block diagram illustrating an exemplary network architecture 200 in which embodiments of the present invention may be implemented. The network architecture 200 may include one or more user devices 100 communicating with one or more servers, such as server 240 over one or more networks 250, according to one embodiment. Network 250 can be a local area network (LAN), a wireless network, a telephone network, a mobile communications network, a wide area network (WAN), such as the Internet, or similar communication system. Server 240 may include a network-accessible server-based functionality, various data stores, and/or other data processing equipment. Server 240 may be implemented by a single machine or a cluster of machines. Server 240 may be hosted, for example, by computer system 900 of FIG. 9. In one embodiment, server 240 hosts server data store 248. Server data store 248 can be a remote, or cloud-based, data store that is used to synchronize local data stores, such as internal data store 238, across various user devices, including user device 100 and other devices. In one embodiment, server data store 248 may be the primary data store utilized by login manager 222 and internal data store 238 may serve as a cache, to temporarily store recently used data from server data store 248.

User device 100 may be any type of computing device including a server computer, gateway computer, desktop computer, laptop computer, mobile communications device, cell phone, smart phone, hand-held computer, tablet computer, or similar computing device. User device 100 may be variously configured with different features to enable viewing of content and resources, and the execution of one or more applications. In one embodiment, user device 100 includes an operating system 232, a web browser application 234, one or more other applications 236, keyboard application 220 and internal data store 238.

Operating system 232 may include a set of programs that manage hardware resources of user device 100 and provide common services for applications, such as web browser 234, applications 236 and keyboard application 220, running on user device 100. In one embodiment, operating system 232 may include a kernel to control low-level processes, such as how memory is read and written, the order in which processes are executed, how information is received and sent by user device 100, to control any peripheral devices, such as monitor, keyboard, mouse, touch screen, etc. and how to interpret information received over networks. Operating system 232 may additionally include a user interface to interact with a user of user device 100, allowing them to control and use applications 236. In one embodiment, the user interface may be graphical with icons and a desktop or home screen, such as a launcher, which may be accessed by the user, for example, using a touch screen display. In one embodiment, the available applications 236 and keyboard application 220 may be displayed as part of the launcher. In addition, operating system 232 may include application programming interfaces (APIs) to provide services and code libraries that let application developers write modular code reusing well defined programming sequences in user space libraries or in the operating system 232 itself. In one embodiment, where user device 100 is a mobile computing device, such as a tablet, the operating system 100 may be the ANDROID operating system from Google Inc. of Mountain View, Calif. In other embodiments, operating system 100 may be some other mobile or non-mobile operating system, such as iOS from Apple Inc., or Windows Phone™ from Microsoft.

Web browser 234 is a software application for retrieving, presenting and traversing information resources on the World Wide Web. An information resource is identified by a Uniform Resource Identifier (URI/URL) and may be a web page, image, video or other piece of content. Hyperlinks present in resources enable users easily to navigate their browsers to related resources. Although web browser 234 may be primarily intended to use the World Wide Web, in other embodiments, it can also be used to access information provided by servers in private networks or files in a file system.

Applications 236 may include software program that cause user device 100 to perform useful tasks beyond the running of the computer itself. Applications 236 may include various types of programs, including for example, content access applications, such as media players, entertainment applications, such as video games, general productivity and information retrieval applications, such as email, calendar, contacts, stock market or weather information applications, social networking applications, or other types of applications. One or more of applications 236 may provide a user interface (e.g., a graphical user interface (GUI)) that includes one or more input fields, into which the user inputs data. The input fields may be, for example, part of a form, into which the user may input his or her personal information and/or other data. The user interface, including the one or more input fields, may be displayed on a display device.

Keyboard application 220 may be an alpha-numeric input program having a user interface that displays a number of distinct buttons or keys. Keyboard application 220 may provide a virtual keyboard that can be used as an on-screen input method in devices with no physical keyboard (or in place of the physical keyboard), such as a touchscreen equipped mobile computing device. The user may input text by tapping the touch screen display where the virtual keyboard is presented. In one embodiment, keyboard application 220 is a standalone application. In other embodiments, however, keyboard application 220 may be built into the operating system 232 of the device 100. In other embodiments, keyboard application 220 may be replaced by, or be used in addition to, an input device application. The input device application may include for example, a voice input interface, a gesture input interface, or some other type of input interface. The input device application may also include login manager 222 and provide functionality similar to that described herein with respect to keyboard application 220.

In one embodiment, keyboard application 220 includes login manager 222. Login manager 222 may be designed to maintain a database of information, such as user login information, in internal data store 238. When one of applications 236 needs login information in order to authenticate the user, the application 236 generally calls keyboard application 220, causing keyboard application 220 to activate and allow the user to input the login information. In one embodiment, login manager 222 stores the login information that was previously entered by user for the application 236. Either, automatically, or in response to the user selecting login manager key 122, login manager 222 can provide the corresponding login information to the requesting application 236. In other embodiments, login manager 222 may not be located within keyboard application 220. For example, login manager 222 could be a standalone program running on user device 100 or be part of some other application. In such an embodiment, keyboard application 220 may call login manager 222 (e.g., using an API published by login manager 222) in order to invoke the functionality of login manager 222, as described herein. Additional details of login manager 222 are provided below.

Figure 3:
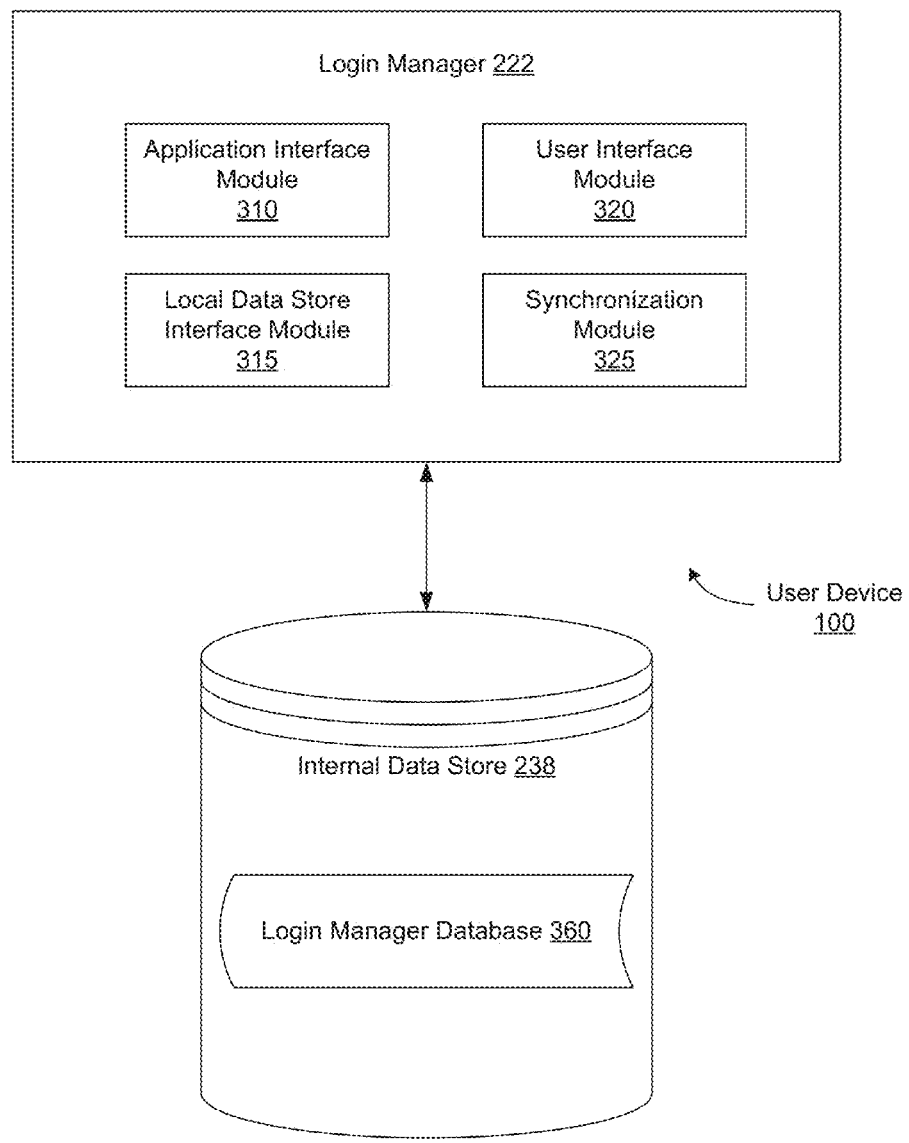
FIG. 3 is a block diagram illustrating a login manager, according to an embodiment.

FIG. 3 is a block diagram illustrating a login manager 222 that is included in user device 100, according to an embodiment. In one embodiment, login manager 222 includes application interface module 310, local data store interface module 315, user interface module 320 and synchronization module 325. This arrangement of modules and components may be a logical separation, and in other embodiments, these modules or other components can be combined together or separated in further components, according to a particular embodiment. In one embodiment, internal data store 238 is connected to login manager 222 and includes login manager database 360. In one embodiment, login manager 222 may be part of keyboard application 220, as shown in FIG. 2. In one embodiment user device 100 may include both login manager 222 and internal data store 238. In another embodiment, the data store may be external to user device 100 and may be connected to user device 100 over a network or other connection. In other embodiments, login manager 222 may include different and/or additional components which are not shown to simplify the description. Internal data store 238 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, application interface module 310 is responsible for communication and interactions with other applications, such as applications 236, operating on user device 100. In one embodiment, application interface module 310 may publish an API that can be called by applications 236 in order to initiate the keyboard application 222. For example, when one of applications 236 is launched and requires login information to authenticate the user or has some other input field that can accept user input, the application 236 may call keyboard application 222 using the API published by application interface module 310. The API call from the application 236 may include certain information about the application 236. For example, the API call may include an identifier of the application, a domain of the application, and optionally information about the fields 112, 114 presented by the application, such as what type of information is requested for those fields. Once login manager 222 identifies, selects, or determines the information that is to be input to the fields 112, 114, application interface module 310 may provide the information to the application 236. In one embodiment, the application 236 requests information from keyboard application 220. For example, application 236 may designate a data buffer in memory to be filled by the keyboard application 220 with received user input or selected login information. Keyboard application 220 may fill the data buffer with the received user input or selected login information and transmit the data buffer back to application 236 or otherwise notify application 236 that the data buffer is available for retrieval.

In one embodiment, local data store interface module 315 manages login manager database 360 in internal data store 238. Local data store interface module 315 can create entries in login manager database 360 for login information or other information associated with a given application 236. In one embodiment, local data store interface module 315 may use information received by application interface module 310 in the application call to identify the application 236. For example, the application call may include an application identifier. Local data store interface module 315 may consult login manager database 360 to determine, using the application identifier, whether an entry corresponding to the application 236 is present. In one embodiment, when the application call contains a hint about the type of data requested for a particular input field (e.g., such as identifying the input field as an email address field 112 or a password field 114), local data store interface module 315 may determine whether the entry in login manager database 360 contains the requested type of login information. Furthermore, local data store interface module 315 may add, remove or modify data in the entries of login manager database 360. One example implementation of login manager database 360 is shown in FIG. 7. Additional details of login manager database 360 are provided below.

In one embodiment, user interface module 320 generates and presents a user interface to enable interaction between login manager 222 and a user of user device 100. In one embodiment, user interface module 320 receives user input (such as login information including usernames, email address, and passwords, or other information) entered using the keyboard interface 120. User interface module 320 may provide that information to local data store interface module 315 for storage in login manager database 360. In one embodiment, once local data store interface module 315 identifies login information associated with the requesting application 236, user interface module 320 may present the associated information and receive a user selection of which information to be input. User interface module 320 may direct application interface module 310 to provide the selected login information to the application 236.

In one embodiment, synchronization module 325 controls synchronization of login manager database 360 with a copy on server data store 248. In one embodiment, once local data store interface module 315 makes changes to login manager database 360, local data store interface module 315 notifies synchronization module 325 of the changes. In response to this notification, synchronization module 325 may propagate the changes to server data store 248 over network 250. In one embodiment, synchronization module 325 provides only the entries in login manager database 260 that were changed (e.g., an incremental update). In another embodiment, synchronization module 325 may provide a copy of the entire login manager database 360. In one embodiment, synchronization module 325 may synchronize with server data store 248 in response to changes to login manager database or after some threshold period of time has passed since the last synchronization. The synchronization may include any process, such as the copy or transfer of data, to ensure consistency between login manager database 360 and server data store 248.

Figure 4:
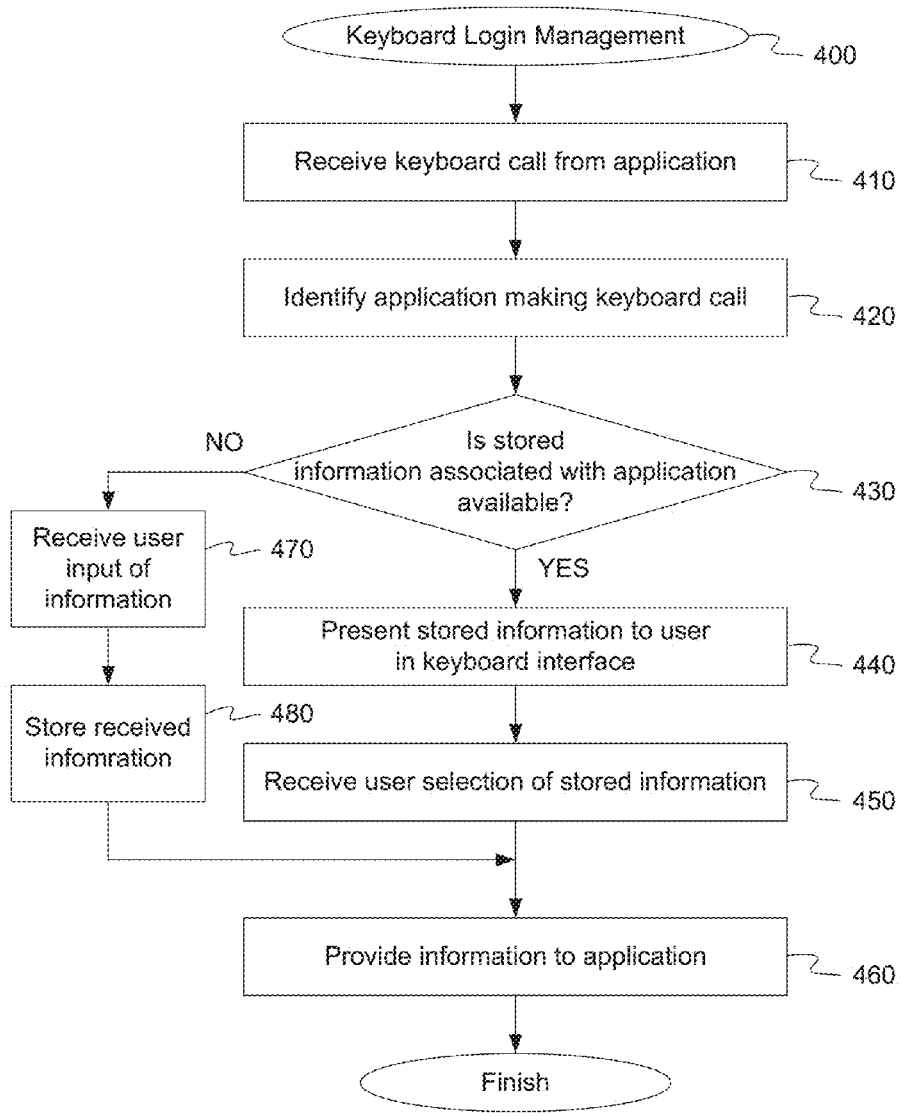
FIG. 4 is a flow diagram illustrating a keyboard login management method, according to an embodiment.

FIG. 4 is a flow diagram illustrating a keyboard login management method, according to an embodiment. The method 400 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to maintain login information using the keyboard application for retrieval and insertion into standalone applications. In one embodiment, method 400 may be performed by login manager 222, as shown in FIGS. 2 and 3.

Referring to FIG. 4, at block 410, method 400 receives an input call from an application 236 operating outside a browser 234 on user device 100. In one embodiment, application interface module 310 may register with the platform or operating system 232 as an input device. The operating system 232 may publish an API that can be called by applications 236 in order to access or invoke an input device, such as keyboard application 222. For example, when one of applications 236 is launched and requires login information to authenticate the user or has some other input field that can accept user input, the application 236 may call keyboard application 222 using the API published by operating system 232. The API call from the application 236 may include certain information about the application 236, such as an identifier of the application, a domain of the application, or other information. The operating system 232 may identify keyboard application 222 as one of the registered input devices and forward the information from the API call to keyboard application 222.

At block 420, method 400 identifies the application 236 from which the input call was received. In one embodiment, local data store interface module 315 may use information received by application interface module 310 in the input call to identify the application 236. Local data store interface module 315 may use the application identifier, domain name or other information to identify the application 236.

At block 430, method 400 determines whether stored login information associated with the application 236 is available in a login manager data store 360. In one embodiment, local data store interface module 315 may consult login manager database 360 to determine, using the application identifier, domain name or other information, whether an entry corresponding to the application 236 is present. FIG. 7 shows an example entry in login manager database 360. In one embodiment, local data store interface module 315 may compare the information received in the input call to the application identifier field 702 or the domain name field 704 to determine if a match is found. If the information received in the input call matches the information stored in the application identifier field 702 or the domain name field 704, local data store interface module 315 can determine that the entry corresponds to the requesting application 236. If the remaining fields (e.g., user name field 706, email address field 708, password field 710, telephone number field 712, or other information field 714) of the entry are populated with non-null values, local data store interface module 315 can determine that stored login information is available. In one embodiment, other information field 714 may be used to store any other type of information, such as address information, bank account information, credit card information, etc.

Figure 8A:
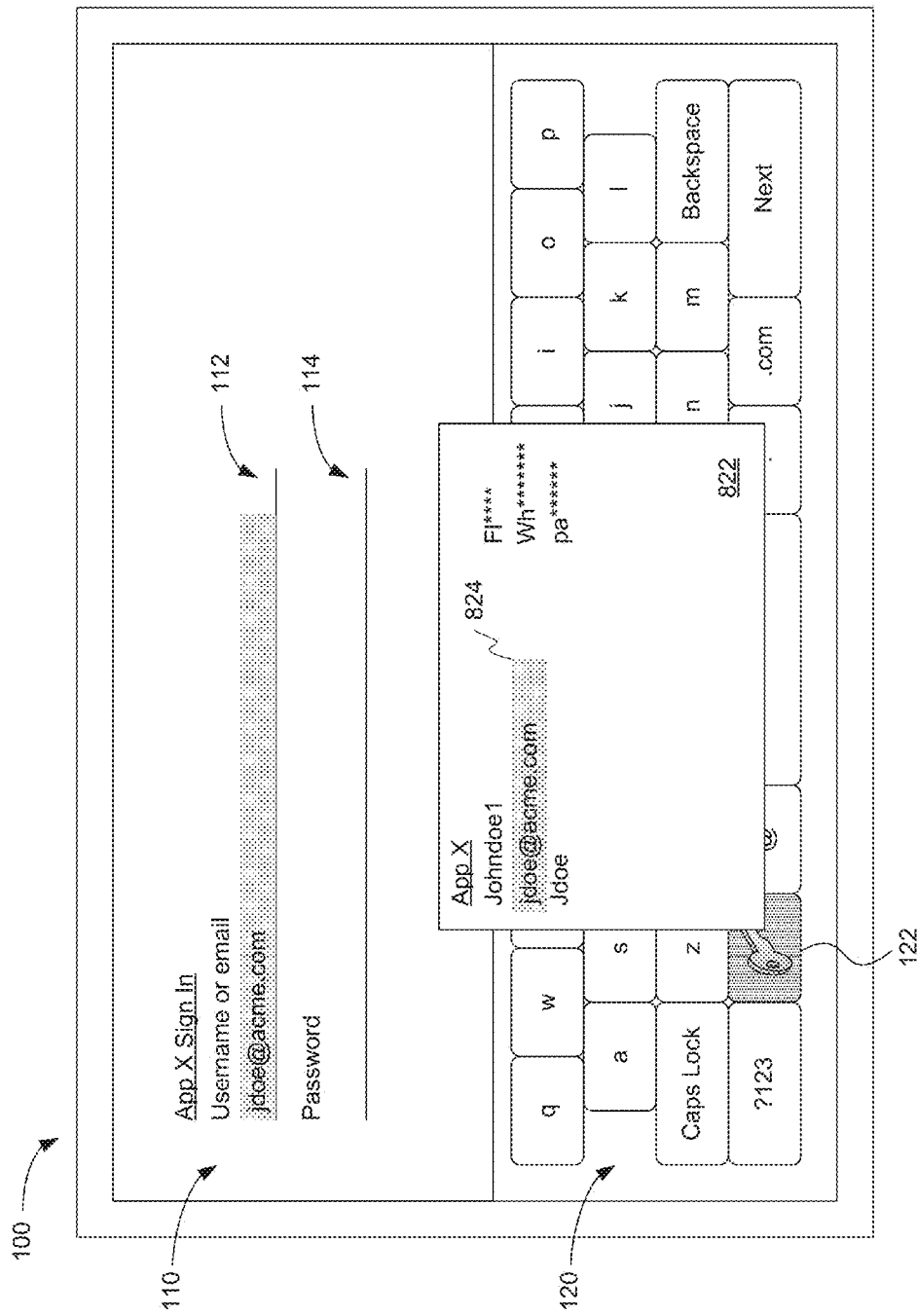
FIGS. 8A and 8B are diagrams illustrating a user interface for a keyboard login manager, according to an embodiment.

If stored login information associated with the application 236 is available, at block 440, method 400 presents one or more pieces of the stored information for selection by the user in a keyboard interface. In one embodiment, user interface module 320 generates and presents a user interface to enable interaction between login manager 222 and a user of user device 100. FIG. 8A is a diagram illustrating a portion of the user interface for a keyboard login manager, according to an embodiment. The interface may include application information window 822 which is shown in response to the user selecting login manager key 122 on keyboard 120. Once local data store interface module 315 identifies login information associated with the requesting application 236, user interface module 320 may present the associated information in the application information window 822. In one embodiment, the information from user name field 706, email address field 708, password field 710, telephone number field 712, and other information field 714 of the corresponding entry in login manager database 360 is presented in application information window 822.

Figure 8B:
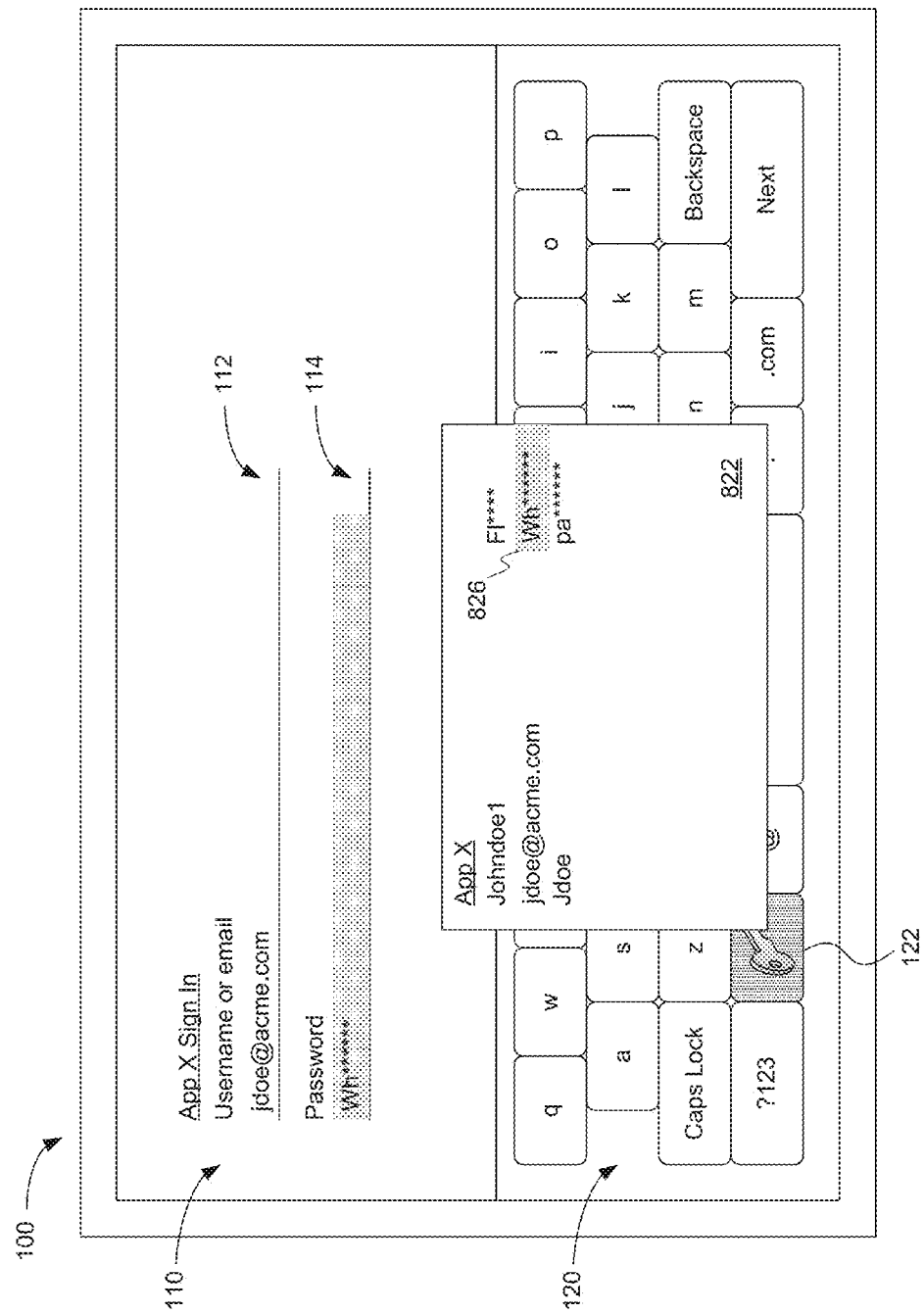

At block 450, method 400 receives a signal representing a user selection of a piece of the stored login information. In one embodiment, a user may activate an area of a touchscreen to select a piece of the information presented in application information window 822. The touchscreen may generate a signal representing the location of the activated area of the touchscreen and provide the signal to user interface module 320, which may interpret the signal as a selection of the piece of displayed login information. In one embodiment, the current field 112 is highlight or otherwise indicated, so that the user can tell which piece of information to select, as shown in FIG. 8A. For example, the user may select email address 824 by touching the email address using a finger or stylus on a touch screen device, using a mouse, track pad or other cursor controller, using a keyboard, or using some other input device. The selected information (e.g., email address 824) may also be highlighted or otherwise indicated upon selection. User interface module 320 may receive the user selection of which information to be input and may direct application interface module 310 to provide the selected login information to the application 236. FIG. 8B is a diagram illustrating a portion of the user interface for a keyboard login manager, according to an embodiment. In this embodiment, password field 114 is highlighted or otherwise selected for data insertion. For example, the user may select password 826 by touching the password using a finger or stylus on a touch screen device, using a mouse, track pad or other cursor controller, using a keyboard, or using some other input device. The selected information (e.g., password 826) may also be highlighted or otherwise indicated upon selection and subsequently provided to input field 114. In one embodiment, the stored passwords, including password 826, may be at least partially obscured when presented in application information window 822 for security purposes. For example, the first one or two characters of the passwords may be displayed, with the remaining characters replaced with an asterisk, dot, or other character.

At block 460, method 400 provides the selected piece of login information to the application 236. Once login manager 222 identifies, selects, or determines the information that is to be input to the fields 112, 114, application interface module 310 may provide the information to the application 236. In one embodiment, application 236 may insert the selected email address 824 into the username/email field 112.

If stored login information associated with the application 236 is not available, at block 470, method 400 prompts the user to input login information and receives user input of the login information through a keyboard interface 120. At block 480, method 400 stores the received login information in login manager data store 360. In one embodiment, local data store interface module 315 enters the information into the fields of a corresponding entry in login manager database 360, where the entry is identified by the application identifier or domain name. If no corresponding entry currently exists, local data store interface module 315 may create a new entry in login manager database 360.

Figure 5:
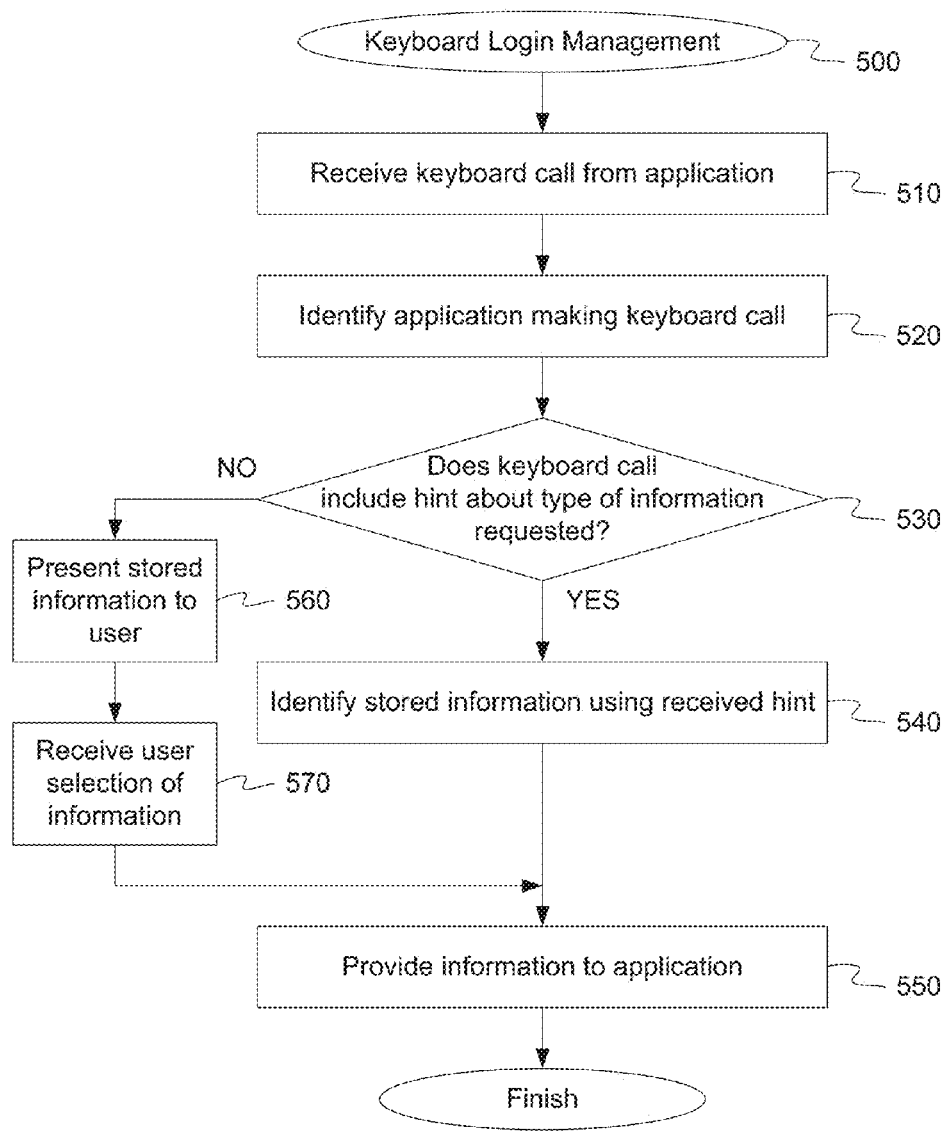
FIG. 5 is a flow diagram illustrating a keyboard login management method, according to an embodiment.

FIG. 5 is a flow diagram illustrating a keyboard login management method, according to an embodiment. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to maintain login information using the keyboard application for retrieval and insertion into standalone applications. In one embodiment, method 400 may be performed by login manager 222, as shown in FIGS. 2 and 3.

Referring to FIG. 5, at block 510, method 500 receives an input call from an application 236 operating outside a browser 234 on user device 100. In one embodiment, application interface module 310 receives a keyboard API call from the application 236. The API call from the application 236 may include certain information about the application 236, such as an identifier of the application, a domain of the application, or other information.

At block 520, method 500 identifies the application 236 from which the input call was received. In one embodiment, local data store interface module 315 may use the application identifier, domain name or other information to identify the application 236 and uniquely distinguish the application 236 from other applications on user device 100.

At block 530, method 500 determines whether the input call includes a hint about the type of information requested by the application 236. In one embodiment, application interface module 310 examines the information received at block 510 and determines whether any of the information includes a hint about the type of data requested for a particular input field (e.g., such as identifying the input field as an email address field 112 or a password field 114).

If the input call includes a hint, at block 540, method 500 identifies a piece of stored login information to be input to application 236 based on the hint. In one embodiment, local data store interface module 315 may identify stored information from the corresponding the entry in login manager database 360 based on the received hint. For example, if the hint indicates that the input field is a username/email field 112, local data store interface module 315 may identify the entry corresponding to the application 236 and the data stored in user name field 706 and email address field 708 of that entry.

At block 550, method 500 provides the piece of login information to the application 236. Once login manager 222 identifies, selects, or determines the information that is to be input to the fields 112, 114, application interface module 310 may provide the information to the application 236. In one embodiment, application 236 may insert user name or email address into the username/email field 112.

If the input call does not include a hint, at block 560, method 500 presents one or more pieces of the stored information for selection by the user in a keyboard interface. In one embodiment, user interface module 320 generates and presents a user interface as shown in FIGS. 8A and 8B. Once local data store interface module 315 identifies login information associated with the requesting application 236, user interface module 320 may present the associated information in the application information window 822. In one embodiment, the information from user name field 706, email address field 708, password field 710, telephone number field 712, and other information field 714 of the corresponding entry in login manager database 360 is presented in application information window 822.

At block 570, method 500 receives a user selection of a piece of the stored login information. In one embodiment, a user may select a piece of the information presented in application information window 822. In one embodiment, the current field 112 is highlight or otherwise indicated, so that the user can tell which piece of information to select. User interface module 320 may receive the user selection of which information to be input and may direct application interface module 310 to provide the selected login information to the application 236.

Figure 6:
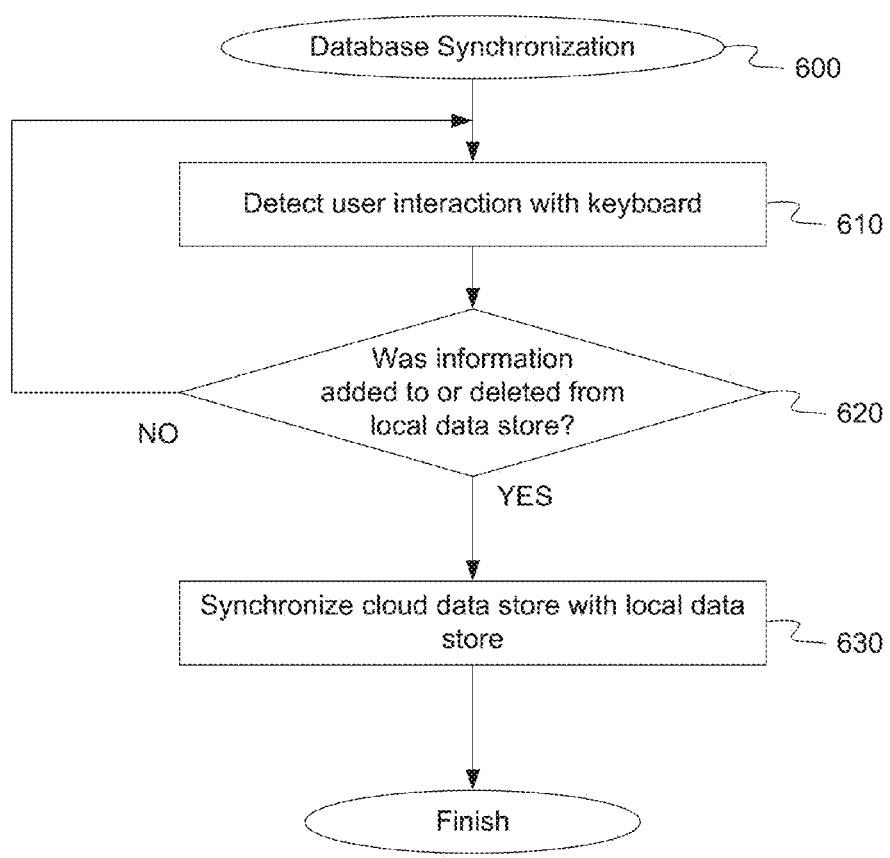
FIG. 6 is a flow diagram illustrating a database synchronization method, according to embodiment.

FIG. 6 is a flow diagram illustrating a database synchronization method, according to an embodiment. The method 600 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to synchronize a login manager database 360 store locally in internal data store 238 with a cloud copy stored in server data store 248. In one embodiment, method 600 may be performed by login manager 222, as shown in FIGS. 2 and 3.

Referring to FIG. 6, at block 610, method 600 detects user interaction with the keyboard interface 120. In one embodiment, user interface module 320 determines when a user takes some action, such as typing in information on keyboard interface 120, pressing login manager key 122, etc. In another embodiment, rather than being based on user interaction, the database synchronization may occur periodically. Thus, at block 610, method 600 may determine that a certain period of time has passed since the last database synchronization.

At block 620, method 600 determines whether information has been added to or deleted from a local login manager data store 360 on internal data store 238. In one embodiment, local data store interface module 315 consults login manager database 360 to determine whether any changes have been made. For example, local data store interface module 315 may compare a current state of login manager database 360 to a previous state and determine if there are any inconsistencies. In another embodiment, local data store interface module 315 may consult a change log maintained by login manager 222 that tracks any changes made to login manager database 360.

If login manager data store 360 has been modified, at block 630, method 600 synchronizes a cloud server data store 248 with the login manager data store 360 on internal data store 238. In one embodiment, synchronization module 325 controls synchronization of login manager database 360 with a copy on server data store 248. In one embodiment, once local data store interface module 315 makes changes to login manager database 360, local data store interface module 315 notifies synchronization module 325 of the changes. In response to this notification, synchronization module 325 may propagate the changes to server data store 248 over network 250. In one embodiment, synchronization module 325 provides only the entries in login manager database 260 that were changed (e.g., an incremental update). In another embodiment, synchronization module 325 may provide a copy of the entire login manager database 360. The synchronization may include any process, such as the copy or transfer of data, to ensure consistency between login manager database 360 and server data store 248.

In one embodiment, method 600 may also synchronize the login manager data store 360 with the cloud server data store 248 in response to an indication received from server 240 over network 250. For example, if the local login manager data store on another user device belonging to the same user is updated and subsequently synchronized with could server data store 248, the cloud server 240 may provide an indication to user device 100 that login manager data store 360 may be updated. In response to receiving this indication, synchronization module 325 may synchronize the data stores as described above. Similarly, in response to cloud server data store 248 being updated at block 630, cloud server may propagate those changes to other devices owned by the same user.

Figure 9:
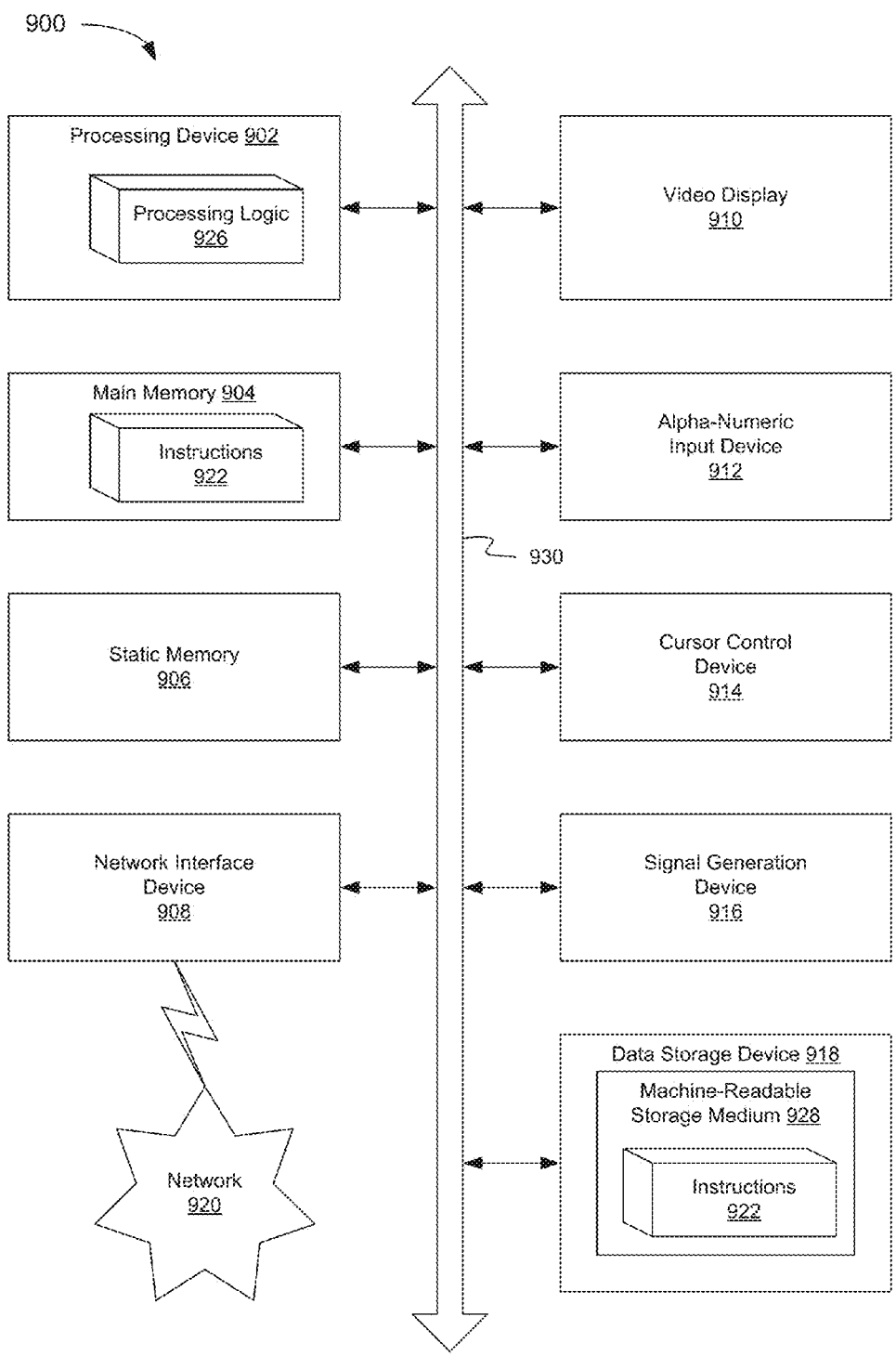
FIG. 9 is a block diagram illustrating an exemplary computer system, according to an embodiment.

FIG. 9 illustrates a diagrammatic representation of a machine in the exemplary form of a computer system 900 within which a set of instructions, for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may represent server 240 and/or user device 100 of FIG. 2.

The exemplary computer system 900 includes a processing device (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute the notification manager 210 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable medium 928 on which is stored one or more sets of instructions 922 (e.g., instructions of login manager 222) embodying any one or more of the methodologies or functions described herein. The instructions 922 may also reside, completely or at least partially, within the main memory 904 and/or within processing logic 926 of the processing device 902 during execution thereof by the computer system 900, the main memory 904 and the processing device 902 also constituting computer-readable media. The instructions may further be transmitted or received over a network 920 via the network interface device 908.

While the computer-readable storage medium 928 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Figure 10:
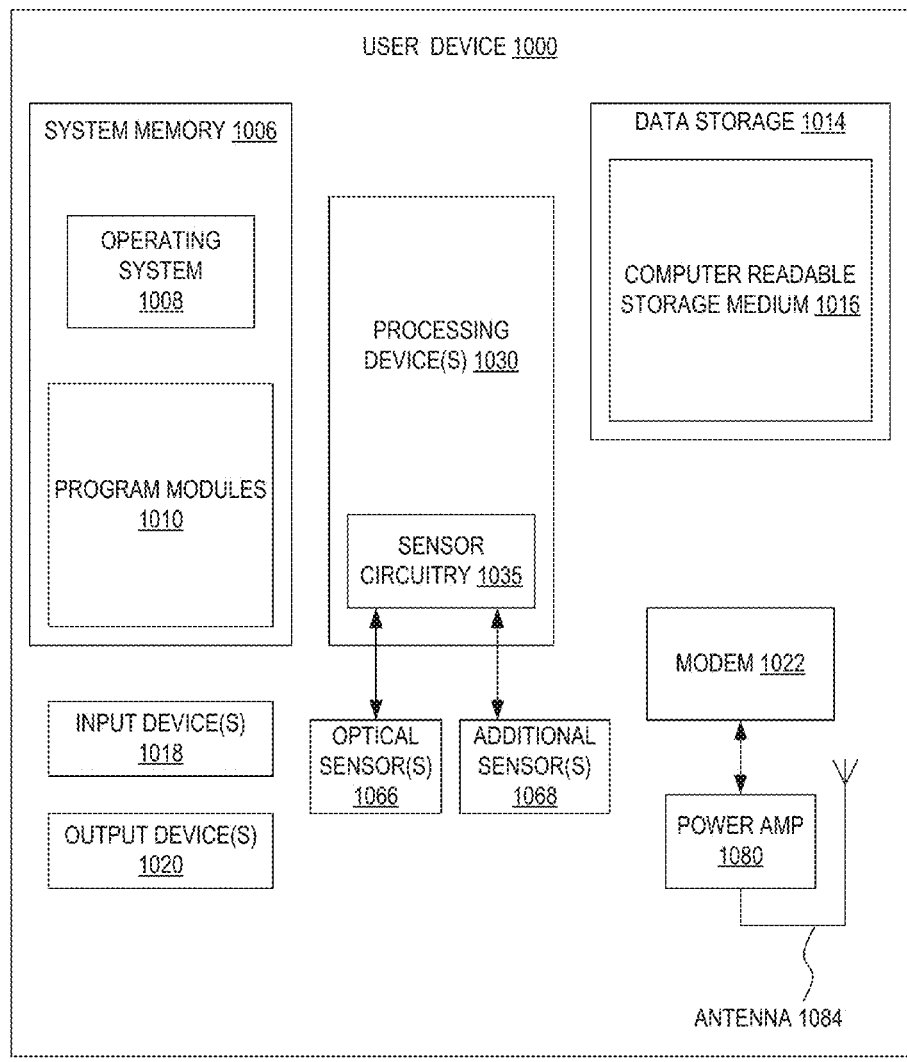
FIG. 10 is a block diagram illustrating an exemplary user device, according to an embodiment.

FIG. 10 is a block diagram illustrating an exemplary user device 1000, according to an embodiment of the present invention. In one embodiment, the user device 1000 may correspond to user device 100 of FIG. 2 and may be any type of user device such as an electronic book reader, a PDA, a mobile phone, a laptop computer, a portable media player, a tablet computer, an electronic pad, a desktop computer, a camera, a video camera, a netbook, and the like.

The user device 1000 includes one or more processing devices 1030, such as one or more CPUs, microcontrollers, field programmable gate arrays, or other types of processors. The user device 1000 also includes system memory 1006, which may correspond to any combination of volatile and/or non-volatile storage mechanisms. The system memory 1006 stores information which provides an operating system component 1008, various program modules 1010, and/or other components. The user device 1000 performs functions by using the processing device(s) 1030 to execute instructions provided by the system memory 1006.

The user device 1000 also includes a data storage device 1014 that may be composed of one or more types of removable storage and/or one or more types of non-removable storage. The data storage device 1014 includes a computer-readable storage medium 1016 on which is stored one or more sets of instructions embodying any one or more of the methodologies or functions described herein. As shown, the instructions may reside, completely or at least partially, within the computer readable storage medium 1016, system memory 1006 and/or within the processing device(s) 1030 during execution thereof by the user device 104, the system memory 1006 and the processing device(s) 1030 also constituting computer-readable media. The user device 1000 may also include one or more input devices 1018 (keyboard, mouse device, specialized selection keys, etc.) and one or more output devices 1020 (displays, printers, audio output mechanisms, etc.).

The user device 1000 further includes a wireless modem 1022 to allow the user device 1000 to communicate via a wireless network (e.g., such as provided by the wireless communication system) and/or with other computing devices, such as remote computers, the item providing system, online book stores, electronic catalogs for libraries, and so forth. The wireless modem 1022 may allow the user device 1000 to handle both voice and non-voice communications (such as communications for text messages, multimedia messages, media downloads, web browsing, etc.) with the wireless communication system 810. The wireless modem 1022 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, etc. The wireless modem 1022 may generate signals and send these signals to power amplifier (amp) 1080 for amplification, after which they are wirelessly transmitted via antenna 1084. In addition to sending data, antenna 1084 also receives data, which is sent to wireless modem 1022 and transferred to processing device(s) 1030.

In one embodiment, user device 1000 includes an optical sensor 1066. The optical sensor 1066 may be a low resolution camera (e.g., having 0.2 or 0.3 Megapixels) that takes images (e.g., of a user's eyes) on a periodic basis. Alternatively, the optical sensor 1066 may have a higher resolution, such as 1 Megapixel up to 10 or more Megapixels. The optical sensor 1066 may be positioned such that images are taken of a user's face while the user holds the user device 1000 in front of his face in a standard reading position. Therefore, the optical sensor 1066 may be used to track user eye movement during reading.

In one embodiment, user device 1000 includes one or more additional sensors 1068 such as a physical contact sensor, close proximity sensors, or motion sensors. The sensors 1068 can detect the presence of human body parts, and convey information regarding the detected presence to processing device(s) 1030. In one embodiment, the sensors 1068 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 1068 may also be optical (e.g., infrared) sensors that use an emitter and receiver pair to detect the presence of opaque objects. Alternatively, the sensors 1068 may be inductive sensors, which include an inductive loop. When the presence of a human body part (or metal object) is brought close to the inductive sensor, an induction of the inductive loop changes, causing the human body part to be detected. Alternatively, the sensors 1068 may be ultrasonic sensors that emit an ultrasonic signal and measure a time duration between when a signal is transmitted and the reflection of that signal received (a.k.a., flight response). The sensors 1068 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 1068 include a motion sensor, such as an accelerometer or one or more gyroscopes. The user device 1000 may use motion data from motion sensors to determine whether a user is holding the user device 1000. For example, if the user device 1000 experiences constant minor accelerations, it may be determined that the user device 1000 is being held in a user's hand. Additionally, if the user device 1000 is at a particular angle (detectable based on acceleration readings from an accelerometer), it may be determined that the user device 1000 is being rested on a user's leg during reading.

The processing device(s) 1030 may include sensor circuitry 1035 (e.g., sensor device drivers) that enables the processing device (s) 1030 to interpret signals received from the optical sensor(s) 1066 and/or additional sensors 1068. In one embodiment, the optical sensors 1066 and/or additional sensors 1068 output raw sensor data. In another embodiment, the optical sensors 1066 and/or additional sensors 1068 output fully processed signals to the processing device (s) 1030. For example, the additional sensors 1068 may output a user contact/no user contact signal using a single line interface or a multi-line interface. In another embodiment, the additional sensors 1068 output, for example, positional data and/or object presence data (e.g., of a human body part) to the processing device 1030 without first processing the data. In either instance, the processing device 1030 may use the sensor circuitry 1035 to process and/or interpret the received data. If data is received from multiple sensors, processing the data may include averaging the data, identifying a maximum from the data, or otherwise combining the data from the multiple sensors.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving, by a keyboard application, an input call from an application running outside a browser application, the input call comprising an identifier of the application running outside the browser application and information to identify a field presented by the application and configured to receive an input;
    identifying, by the keyboard application, the application from which the input call was received;
    determining, by a processing device executing the keyboard application, that stored login information associated with the application is available in a login manager data store associated with the keyboard application, the stored login information to be input to the field presented by the application;
    determining that the input call received from the application comprises an indication of a type of information to be input to the field presented by the application;
    identifying the application running outside the browser window using the received identifier and identifying a piece of the stored login information, from the one or more pieces of the stored login information without user input, the piece of the stored login information corresponding to the type of information to be input to the field; and
    providing, by the keyboard application, the piece of the stored login information to the application from which the input call was received.

2. The method of claim 1, wherein the first piece of the stored login information comprises at least one of a username, an email address or a password.

3. The method of claim 1, further comprising:
    displaying a designated key as part of the keyboard interface associated with the keyboard application, the designated key to provide an indication that the stored login information associated with the application is available in the login manager data store.

4. A system, comprising:
    a memory to store an application, a user-input application comprising a login manager, and a login manager data store; and
    a processing device operatively coupled to the memory, the processing device to execute the login manager to:
        receive an input call from the application, the input call comprising an identifier of the application and information to identify a field presented by the application and configured to receive an input;
        determine that stored information associated with the application is available in the login manager data store;
        determine that the input call received from the application comprises an indication of a type of information to be input to the field presented by the application;
        identify the application using the received identifier and identify a piece of the stored information corresponding to the type of information to be input to the field; and
        provide the piece of the stored information to the application from which the input call was received.

5. The system of claim 4, wherein the application operates outside a browser application, wherein the input device application comprises a keyboard application.

6. The system of claim 4, wherein the processing device is further configured to:
    identify, using an application identifier and the login manager data store, the application from which the input call was received, the application identifier being received with the input call.

7. The system of claim 6, wherein to determine that stored information associated with the application is available in the login manager data store, the processing device to identify a corresponding entry in the login manager data store using the application identifier and determine that the corresponding entry comprises stored login information.

8. The system of claim 4, wherein the stored information comprises at least one of a user name, an email address, or a password.

9. The system of claim 4, wherein the processing device is further configured to:
- present the stored information via a user-input interface; and
- receive, via the user-input interface, an input indicating selection of a unit of the stored information.

10. The system of claim 4, wherein the processing device is further configured to:
- determine that stored information is not available;
- prompt the user to enter information and receive the information through a user-input interface provided by the user-input application;
- store the information in the login manager data store; and
- provide the information to the application for input to a field presented by the application.

11. The system of claim 4, wherein the processing device is further configured to:
- determine that information in a cloud data store is inconsistent with information in the login manager data store; and
- synchronize the cloud data store with the login manager data store.

12. A non-transitory computer-readable storage medium storing instructions which, when executed by a processor embedded in an electronic device, cause the processor to:
- receive, by a keyboard application of the electronic device, an input call from an application, the input call comprising an identifier of the application and information to identify a field presented by the application and configured to receive an input;
- determine, by the processor executing the keyboard application, that stored information associated with the application is available in a login manager data store;
- determine that the input call received from the application comprises an indication of a type of information to be input to the field presented by the application;
- identify the application using the received identifier and identify a unit of the stored information corresponding to the type of information to be input to the field; and
- provide, by the keyboard application, the unit of the stored information to the application from which the input call was received.

13. The non-transitory computer-readable storage medium of claim 12, wherein the operations further comprise:
- identifying, by the keyboard application, the application from which the input call was received.

14. The non-transitory computer-readable storage medium of claim 12, wherein the input call comprises an application programming interface (API) call.

15. The non-transitory computer-readable storage medium of claim 12, wherein the information associated with the application is stored in a local database comprising the login manager data store.

16. The non-transitory computer-readable storage medium of claim 12, wherein the processor further to:
- cause display of a designated key as part of the keyboard interface associated with the keyboard application, the designated key to provide an indication that stored information associated with the application is available in a login manager data store.

17. The non-transitory computer-readable storage medium of claim 16, wherein the processor further to:
- receive a signal representing a user selection of the designated key on the keyboard application; and
- cause presentation of the stored information via the keyboard interface in response to the selection of the designated key.

18. The non-transitory computer-readable storage medium of claim 12, wherein the processor further to:
- determine that stored information is not available;
- receive information through a keyboard interface provided by the keyboard application; and
- store the received information in the login manager data store.

19. The non-transitory computer-readable storage medium of claim 12, wherein to provide the selected unit of the stored information to the application, the processor to fill a designated data buffer with the selected unit of stored information and transmitting the designated data buffer to the application.

* * * * *